US012800507B2

(12) United States Patent
Nakayama et al.

(10) Patent No.: US 12,800,507 B2
(45) Date of Patent: Nov. 17, 2026

(54) LUMINESCENT BIOLOGICAL SAMPLE ANALYSIS DEVICE AND BIOLOGICAL SAMPLE ANALYSIS METHOD WITH IMPROVED ACCURACY

(71) Applicant: HORIBA Advanced Techno, Co., Ltd., Kyoto (JP)

(72) Inventors: Hideki Nakayama, Kyoto (JP); Yoshiki Fukao, Kyoto (JP); Masanori Kido, Kyoto (JP); Yoko Nakai, Kyoto (JP); Yohei Oka, Kyoto (JP)

(73) Assignee: HORIBA Advanced Techno, Co., Ltd., Kyoto (JP)

( * ) Notice: Subject to any disclaimer, the term of this patent is extended or adjusted under 35 U.S.C. 154(b) by 711 days.

(21) Appl. No.: 17/595,578

(22) PCT Filed: May 15, 2020

(86) PCT No.: PCT/JP2020/019535
§ 371 (c)(1),
(2) Date: Nov. 19, 2021

(87) PCT Pub. No.: WO2021/002105
PCT Pub. Date: Jan. 7, 2021

(65) Prior Publication Data
US 2022/0178832 A1 Jun. 9, 2022

(30) Foreign Application Priority Data
Jul. 2, 2019 (JP) ................................ 2019-123882

(51) Int. Cl.
*G01N 21/76* (2006.01)
*G01N 21/25* (2006.01)

(52) U.S. Cl.
CPC ......... *G01N 21/763* (2013.01); *G01N 21/253* (2013.01); *G01N 2201/12707* (2013.01)

(58) Field of Classification Search
CPC ............... G01N 21/763; G01N 21/253; G01N 2201/12707; G01N 21/645; G01N 21/76;
(Continued)

(56) References Cited

U.S. PATENT DOCUMENTS 4,176,007 A * 11/1979 Frosch .................... C12Q 1/06 436/66
4,287,155 A * 9/1981 Tersteeg ................ B01L 3/5085 422/942
(Continued)

FOREIGN PATENT DOCUMENTS

CN 1876829 A 12/2006
CN 101290294 A 10/2008
(Continued)

OTHER PUBLICATIONS

Kimmich, G. A. et al, Analytical Biochemistry 1975, 69, 187-206. (Year: 1975).*
(Continued)

*Primary Examiner* — Arlen Soderquist
(74) *Attorney, Agent, or Firm* — Alleman Hall LLP

(57) ABSTRACT

The present invention shortens measurement time of a sample and improves measurement accuracy. The present invention is a biological sample analysis device that stores a sample containing a biological substance and a luminescent reagent in a container, detects luminescence generated by reacting the sample and the luminescent reagent, and analyzes the biological substance, the present invention including a photodetector that detects the luminescence and outputs a light intensity signal, and a calculator that subtracts the light intensity signal obtained before the sample and the luminescent reagent react from the light intensity signal obtained after the sample and the luminescent reagent react
(Continued)

to remove light stored in the container, and calculates a value related to an amount of the biological substance.

9 Claims, 13 Drawing Sheets

(58) Field of Classification Search

CPC ......... G01N 2021/174; G01N 21/6428; G01N 21/6486; G01N 21/274; G01N 2021/7786; G01N 35/00584; G01N 35/00594; G01N 35/00613; G01N 35/00623; G01N 35/025; G01N 2035/0439; G01N 2035/0441; G01N 2035/0443; G01N 2035/0444; G01N 2035/0446; C12M 41/36; Y10T 436/113332

USPC ....... 422/52, 63–67, 82.05–82.8; 436/43, 47, 436/164, 172

See application file for complete search history.

(56) References Cited

U.S. PATENT DOCUMENTS 4,385,113 A * 5/1983 Chappelle ................ C12Q 1/66 435/8
4,390,274 A * 6/1983 Berthold ................ G01N 21/76 356/436
4,478,094 A * 10/1984 Salomaa .................. G01N 1/38 422/65
4,554,839 A * 11/1985 Hewett ................. B01L 3/5085 422/561
4,818,883 A * 4/1989 Anderson .............. G01N 21/76 250/361 C
5,082,628 A * 1/1992 Andreotti ............... G01N 21/76 250/361 C
5,096,807 A * 3/1992 Leaback .......... G01N 33/54373 435/965
5,108,893 A * 4/1992 Baret ....................... C12Q 1/26 252/700
5,139,745 A * 8/1992 Barr ....................... G01N 21/76 250/361 C
5,422,075 A * 6/1995 Saito ...................... G01N 21/76 250/361 C
5,578,270 A * 11/1996 Reichler ................. B01L 3/502 422/67
5,582,796 A * 12/1996 Carey ................ G01N 35/1002 422/549
5,658,748 A * 8/1997 Mayra-Makinen .......................... C12N 9/0071 435/253.4
5,660,995 A * 8/1997 O'Connor .............. G01N 33/94 435/962
5,798,263 A * 8/1998 Wood ................... G01N 21/763 250/361 C
5,904,899 A * 5/1999 Hayashi ............. G01N 33/5302 422/65
5,928,952 A * 7/1999 Hutchins ..................... B25J 9/00 422/561
6,090,589 A * 7/2000 Dimond ............... C12Q 1/6806 536/25.4
6,254,826 B1 * 7/2001 Acosta ................. G01N 35/028 422/65
6,627,446 B1 * 9/2003 Roach .............. G01N 27/44791 436/514
6,682,903 B2 * 1/2004 Saunders ............. G01N 33/581 435/7.92
6,691,748 B1 * 2/2004 Tajima ............... G01N 35/0099 422/562
8,323,567 B2 * 12/2012 Aoyagi .............. G01N 35/1065 422/63
8,628,953 B2 1/2014 Osato et al.
11,280,741 B2 * 3/2022 Nakagawa ............. G01N 21/01
12,123,887 B2 * 10/2024 Nakayama ............. G01N 35/04
2002/0176801 A1 * 11/2002 Giebeler .............. G01N 21/253 422/63
2003/0104507 A1 * 6/2003 Wood ..................... C12Q 1/008 435/8
2003/0170613 A1 * 9/2003 Straus ................ G01N 21/6428 435/5
2003/0219891 A1 * 11/2003 Yazawa ................ C12Q 1/6827 382/128
2004/0014159 A1 * 1/2004 Goueli ..................... C12Q 1/42 435/23
2004/0101922 A1 * 5/2004 Somberg ................ C12Q 1/485 435/15
2004/0127781 A1 * 7/2004 Cable ..................... G01N 21/01 600/407
2004/0191121 A1 * 9/2004 Tomasso ................ G01N 35/04 422/63
2004/0191923 A1 * 9/2004 Tomasso .............. G01N 35/025 422/63
2004/0230400 A1 * 11/2004 Tomasso .......... G01N 35/00029 702/183
2004/0265942 A1 * 12/2004 Slater ..................... C12Q 1/485 435/15
2005/0026171 A1 * 2/2005 Hawkins .................. C12Q 1/66 435/8
2005/0220669 A1 * 10/2005 Malyarov ............ G01N 21/645 422/64
2005/0221471 A1 * 10/2005 Ramsay ............... G01N 33/528 435/287.1
2006/0081539 A1 * 4/2006 Safar ..................... B01L 3/5082 210/695
2006/0210435 A1 * 9/2006 Alavie ............... G01N 35/0092 422/65
2006/0264782 A1 * 11/2006 Holmes ................ A61B 5/1427 600/583
2006/0292647 A1 * 12/2006 Green ................ G01N 33/5695 435/7.32
2007/0111327 A1 * 5/2007 Jay ................... G01N 33/54373 436/518
2007/0141717 A1 * 6/2007 Carpenter .............. G01N 33/58 436/172
2007/0180935 A1 * 8/2007 Angus ................... B01L 3/0279 73/864.11
2007/0207514 A1 * 9/2007 Grinon ................. G01N 21/763 435/8
2008/0261294 A1 * 10/2008 Noda ....................... C12Q 1/04 435/286.2
2009/0117620 A1 * 5/2009 Fritchie ................. B01L 3/5085 422/68.1
2009/0142785 A1 6/2009 Osato et al.
2009/0317803 A1 * 12/2009 Golovlev ................. C12Q 1/66 435/6.15
2010/0098589 A1 * 4/2010 Kubota .................. G01N 21/77 73/1.02
2010/0126286 A1 * 5/2010 Self ........................ G01N 35/04 73/863.81
2010/0126857 A1 * 5/2010 Polwart ................... B01L 9/527 422/68.1
2010/0136563 A1 * 6/2010 Keller .................. C12Q 1/6806 435/6.12
2011/0081646 A1 * 4/2011 Carrick .................. C12Q 1/701 435/5
2012/0250024 A1 10/2012 Noda et al.
2014/0064902 A1 * 3/2014 Gisler .............. G01N 35/00871 414/749.3
2014/0186212 A1 * 7/2014 Freeman .............. G01N 21/253 422/52
2014/0339444 A1 * 11/2014 Tanabe ............... G01N 15/1429 250/573
2015/0087011 A1 * 3/2015 Moscetta ........... G01N 33/1866 435/288.3
2015/0253250 A1 * 9/2015 Noda ....................... C12M 1/34 422/52
2015/0276779 A1 * 10/2015 Burkard ............. G01N 35/1011 422/67

(56) References Cited

U.S. PATENT DOCUMENTS

| | | | | |
|---|---|---|---|---|
| 2016/0102338 | A1* | 4/2016 | Alves | C12Q 1/66 435/8 |
| 2017/0089934 | A1* | 3/2017 | Hori | G01N 21/76 |
| 2017/0219615 | A1* | 8/2017 | Matsumoto | G01N 21/645 |
| 2017/0350912 | A1* | 12/2017 | Maetzler | G01N 35/04 |
| 2018/0024070 | A1 | 1/2018 | Okanojo et al. | |
| 2020/0110033 | A1 | 4/2020 | Nakagawa et al. | |
| 2021/0116470 | A1 | 4/2021 | Nakayama et al. | |
| 2021/0270838 | A1* | 9/2021 | Sitton | G01N 33/582 |
| 2022/0228191 | A1* | 7/2022 | Nakayama | G01N 35/028 |

FOREIGN PATENT DOCUMENTS

| | | | |
|---|---|---|---|
| CN | 108027380 | A | 5/2018 |
| JP | 2000314738 | A | 11/2000 |
| JP | 2008268019 | A | 11/2008 |
| JP | 2011226926 | A | 11/2011 |
| JP | 2012042251 | A | 3/2012 |
| JP | 2014006213 | A | 1/2014 |
| JP | 2018169291 | A | 11/2018 |
| JP | 2019514007 | A | 5/2019 |
| WO | 2016174766 | A1 | 11/2016 |
| WO | 2017181135 | A2 | 10/2017 |
| WO | 2019013359 | A1 | 1/2019 |
| WO | 2019013360 | A1 | 1/2019 |

OTHER PUBLICATIONS

Eiland, F., Soil Biology and Biochemistry 1983, 15, 665-670. (Year: 1983).*

Jago, P. H. et al, Journal of Bioluminescence and Chemiluminescence 1989, 3, 131-145. (Year: 1989).*

Rieger, D., Analytical Biochemistry 1997, 246, 67-70. (Year: 1997).*

Ronner, P. et al, Analytical Biochemistry 1999, 275, 208-216. (Year: 1999).*

Thompson, A., Encyclopedia of Food Microbiology 1999, 101-109. (Year: 1999).*

Long, J. A. et al, Theriogenology 2006, 65, 1620-1630. (Year: 2006).*

Shinozaki, Y. et al, Biocontrol Science 2013, 18, 1-7. (Year: 2013).*

Yue, W. et al, Journal of Food Safety 2013, 33, 1-7. (Year: 2013).*

Patergnani, S. et al, Methods in Enzymology 2014, 542, 313-332. (Year: 2014).*

Bottari, B. et al, Trends in Food Science & Technology 2015, 44, 36-48. (Year: 2015).*

Whalen, P. A. et al, Microbiological sensors for the drinking water industry 2018, 137-154. (Year: 2018).*

European Patent Office, Partial Supplementary European Search Report Issued in Application No. 20834261.8, Dec. 15, 2022 Germany, 14 pages.

SA Japan Patent Office, International Search Report Issued in Application No. PCT/JP2020/019535, Aug. 18, 2020, WIPO, 4 pages.

China National Intellectual Property Administration, Office Action and Search Report Issued in Application No. 202080038505.0, Jul. 19, 2023, 24 pages.

Japan Patent Office, Office Action Issued in Application No. 2021-529907, Mar. 5, 2024, 10 pages.

* cited by examiner

| | CALIBRATION SOLUTION (DISPENSE TO CONTAINERS 2s AND 2z) | | SAMPLE (DISPENSE TO CARTRIDGE FC AND THEN MOVE TO CONTAINER 2) | | |
|---|---|---|---|---|---|
| | ZERO | STD | DISPENSING AMOUNT TO CARTRIDGE | | VOLUME IN CONTAINER 2 |
| SAMPLE FOR STD OR ZERO | a | a | $k_1a$ | DISPENSE MIXED SOLUTION SHOWN IN LEFT COLUMN TO CONTAINER 2 | a |
| ATP SCAVENGING SOLUTION | b | b | $k_2b$ | | b |
| SPORE REACTION SOLUTION | c | c | $k_3c$ | | c |
| ATP EXTRACT | d | d | $k_4d$ | | d |
| LUMINESCENT REAGENT | e (a+b+c+d) | e (a+b+c+d) | | | e (a+b+c+d) |

FIG. 8

LUMINESCENT BIOLOGICAL SAMPLE ANALYSIS DEVICE AND BIOLOGICAL SAMPLE ANALYSIS METHOD WITH IMPROVED ACCURACY

TECHNICAL FIELD

The present invention relates to a biological sample analysis device and a biological sample analysis method of analyzing light generated from a biological substance contained in a sample.

BACKGROUND ART

Conventionally, microbial monitoring has been performed for environmental management of pharmaceutical production plants, food plants, and the like. As an example of this microbial monitoring, a luminescent reagent is added to adenosine triphosphate (ATP) contained in a microorganism, bioluminescence of the luminescent reagent is measured, an obtained luminescence intensity is converted into an ATP amount, and thus correlation with bacterium can be taken.

As a device that analyzes light generated by a biological substance such as ATP, a device disclosed in Patent Literature 1 is considered. This biological sample analysis device adds a luminescent reagent to a sample containing a biological substance, and detects a luminescence intensity at a luminescence peak and a luminescence intensity in a state where luminescence is reduced after a predetermined time (for example, about 10 minutes) from the luminescence peak. In this device, a luminescence intensity obtained by subtracting the "luminescence intensity in a state where the luminescence is reduced" from the "luminescence intensity at the luminescence peak" is used for conversion into the number of bacteria.

However, in the above method, it is necessary to wait for a predetermined time (for example, about 10 minutes) to elapse from the luminescence peak in order to detect the "luminescence intensity in a state where the luminescence is reduced", and measurement of one sample takes long time. This problem is particularly noticeable when a plurality of samples are measured.

In a case where the container storing the sample includes resin, the container stores light such as ultraviolet rays or fluorescent lamps outside or stores bioluminescence, and the "luminescence intensity in a state where the luminescence is reduced" includes the light stored in the container, and this deteriorates measurement accuracy.

CITATION LIST

Patent Literature

Patent Literature 1: JP 2008-268019 A

SUMMARY OF INVENTION

Technical Problem

The present invention has been made to solve the above problems, and a main object of the present invention is to provide a biological sample analysis device that stores a sample containing a biological substance and a luminescent reagent in a container, detects luminescence generated by reacting the sample and the luminescent reagent, and analyzes the biological substance, the biological sample analysis device shortening measurement time of the sample and improving measurement accuracy.

Solution to Problem

Abiological sample analysis device of the present invention stores a sample containing a biological substance and a luminescent reagent in a container, detects luminescence generated by reacting the sample and the luminescent reagent, and analyzes the biological substance, the biological sample analysis device including a photodetector that detects the luminescence and outputs a light intensity signal, and a calculator that subtracts the light intensity signal obtained before the sample and the luminescent reagent react from the light intensity signal obtained after the sample and the luminescent reagent react to remove light stored in the container, and calculates a value related to an amount of the biological substance.

In the biological sample analysis device configured as described above, the light intensity signal obtained before the sample and the luminescent reagent react is subtracted from the light intensity signal obtained after the sample and the luminescent reagent react to calculate the value related to the amount of the biological substance, and thus, there is no need to detect the "luminescence intensity in a state where the luminescence is reduced" as in the conventional art. As a result, measurement time of the sample can be shortened. Further, since the light stored in the container is removed by subtracting the light intensity signal obtained before the sample and the luminescent reagent react from the light intensity signal obtained after the sample and the luminescent reagent react, there is no need to consider the light stored in the container, and measurement accuracy can be improved. Here, the light stored in the container is light other than bioluminescence generated by reaction of the sample and the luminescent reagent, and includes phosphorescence and fluorescence emitted from the container.

Here, in order to improve analysis efficiency of the biological sample, it is conceivable that the biological sample analysis device sequentially measures the luminescence of the sample stored in a plurality of the containers.

In this case, the stored light amounts in the plurality of containers are different from each other. Thus, the stored light amount to be subtracted differs for each container. Therefore, the calculator desirably subtracts the light intensity signal obtained before the sample and the luminescent reagent react from the light intensity signal obtained after the sample and the luminescent reagent react in each of the plurality of containers. This configuration can improve the measurement accuracy in each of the plurality of containers.

In the biological sample analysis device of the present invention, it is conceivable that the biological substance includes adenosine triphosphate (ATP), and ATP-derived luminescence generated by a reaction between the sample and an ATP luminescent reagent is detected.

In order to improve the analysis efficiency by automatically introducing the reagent into the sample, the biological sample analysis device of the present invention desirably further includes a dispensing mechanism that dispenses a reagent into the sample, a standard solution having a known ATP amount, and a zero solution having a zero ATP amount. Specifically, the dispensing mechanism dispenses an ATP scavenging solution, a spore reaction solution, an ATP extract, a luminescent reagent, and the like into the sample, the standard solution, and the zero solution.

Conventionally, solution amounts of each reagent are different among the standard solution, the zero solution, and the sample. As described above, since the solution amounts of each reagent are different among the standard solution, the zero solution, and the sample, pH in the solution is different, a luminescence intensity is different, and accurate light intensity cannot be detected.

In order to suitably solve this problem and detect an accurate light intensity, the dispensing mechanism is desirably controlled to equalize a mixing ratio of the ATP scavenging solution, the spore reaction solution, and the ATP extract to be added to the sample, a mixing ratio of the ATP scavenging solution, the spore reaction solution, and the ATP extract in the standard solution, and a mixing ratio of the ATP scavenging solution, the spore reaction solution, and the ATP extract in the zero solution.

The ATP extract has an effect of inactivating the ATP scavenging solution.

Therefore, the dispensing mechanism is desirably controlled to dispense the ATP extract after adding the ATP scavenging solution and the spore reaction solution to the standard solution.

By dispensing the reagents in that order, the standard solution containing the ATP scavenging solution can be created.

Furthermore, a biological sample analysis device of the present invention desirably further includes a housing body that accommodates a measurement system instrument for biological sample analysis inside and includes an opening, a door that opens and closes the opening of the housing body, and uneven structures respectively provided on contact portions of the opening of the housing body and the door, the uneven structures being fitted to each other in a state where the door closes the opening.

In this configuration, light entering inside of the device from between the housing body and the door can be blocked by the uneven structures, and measurement accuracy can be improved.

In addition, it is conceivable that the biological sample analysis device of the present invention further includes a disposal box in which pipette tips that inject the reagent into the sample are discarded.

In this configuration, in order to reliably discard the pipette tips in the disposal box, the disposal box desirably includes disposal spaces respectively partitioned for the pipette tips to be discarded, the disposal box including a slope that inclines the pipette tips discarded in the disposal spaces in a predetermined direction. Note that, in a configuration in which the slope is not provided, directions of the pipette tips discarded in the disposal spaces vary, and this variation may interfere with the pipette tips to be discarded.

A biological sample analysis method of the present invention stores a sample containing a biological substance and a luminescent reagent in a container, detects luminescence generated by reacting the sample and the luminescent reagent, and analyzes the biological substance, the method including subtracting a light intensity signal obtained before the sample and the luminescent reagent react from the light intensity signal obtained after the sample and the luminescent reagent react to remove light stored in the container, and calculating a value related to an amount of the biological substance.

Advantageous Effects of Invention

In the present invention configured as described above, the biological sample analysis device stores a sample containing a biological substance and a luminescent reagent in a container, detects luminescence generated by reacting the sample and the luminescent reagent, and analyzes the biological substance, the biological sample analysis device being capable of shortening the measurement time of the sample and improving the measurement accuracy.

BRIEF DESCRIPTION OF DRAWINGS

FIG. 8 is a table illustrating an injection amount of each reagent in a sample, a standard solution, and a zero solution.

LIST OF REFERENCE CHARACTERS

Figure 1:
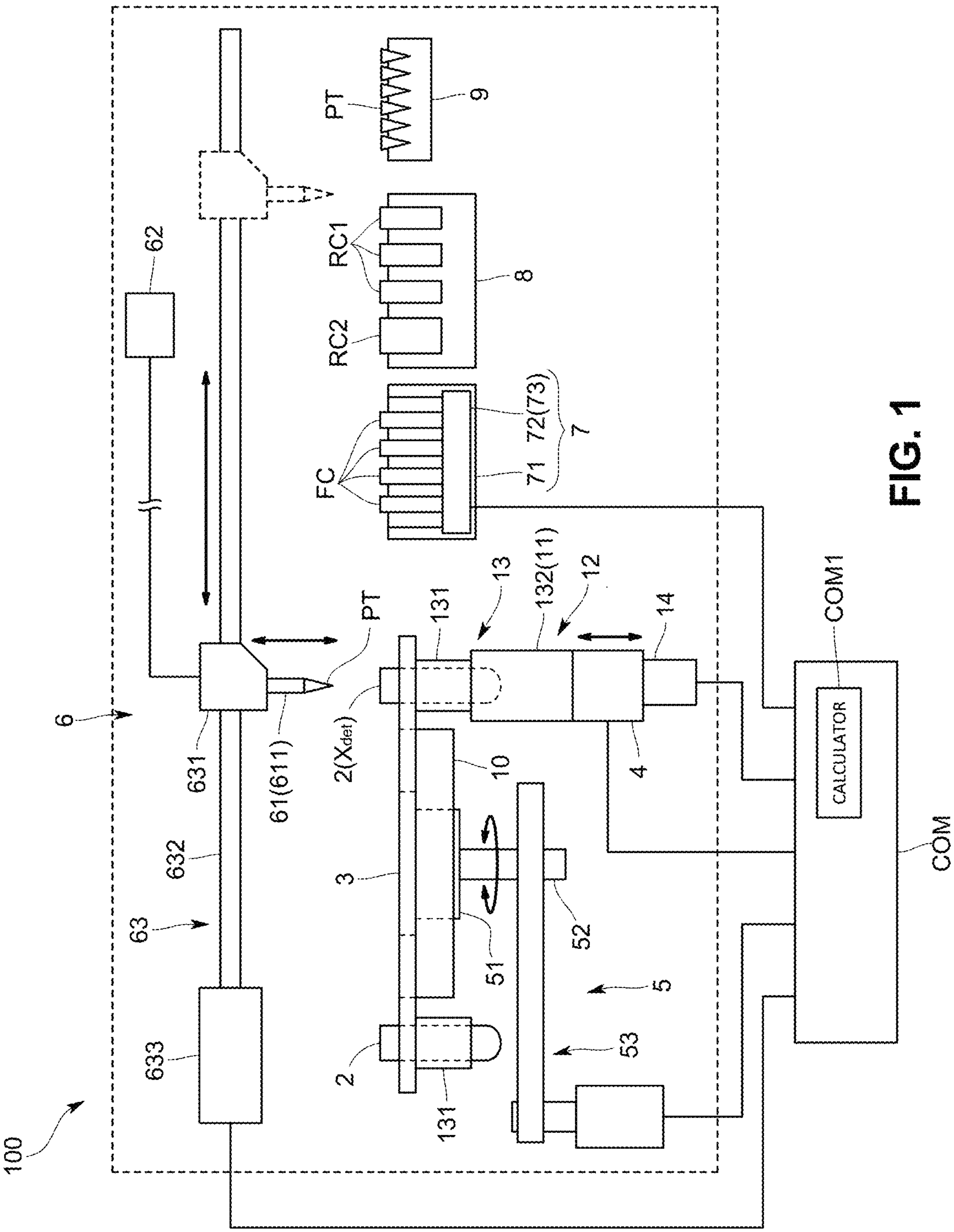
FIG. 1 is a schematic diagram illustrating a configuration of a biological sample analysis device according to the embodiment.

100 biological sample analysis device
2 container
4 photodetector
COM1 calculator
6 dispensing mechanism
C1*h* opening
C1 housing body
C2 door
15, 16 uneven structure
PT pipette tip
disposal box
10*s* disposal space
10*y* slope

DESCRIPTION OF EMBODIMENT

Hereinafter, an embodiment of a biological sample analysis device of the present invention will be described with reference to the drawings.

<Device Configuration>

A biological sample analysis device 100 according to the embodiment analyzes light generated by a biological substance contained in a sample to measure an amount of the biological substance. Hereinafter, an ATP amount measurement device that measures an amount (amol ($=10^{-18}$ mol)) of adenosine triphosphate (ATP) as a biological substance will be described.

Specifically, as illustrated in FIG. 1, the biological sample analysis device 100 includes a holder 3 that holds a plurality of containers 2 storing a sample, a photodetector 4 fixed at a predetermined position, a holder drive mechanism 5 that moves the holder 3, and a dispensing mechanism 6 that dispenses a luminescent reagent that reacts with ATP to generate light into the container 2 held by the holder 3.

Figure 2:
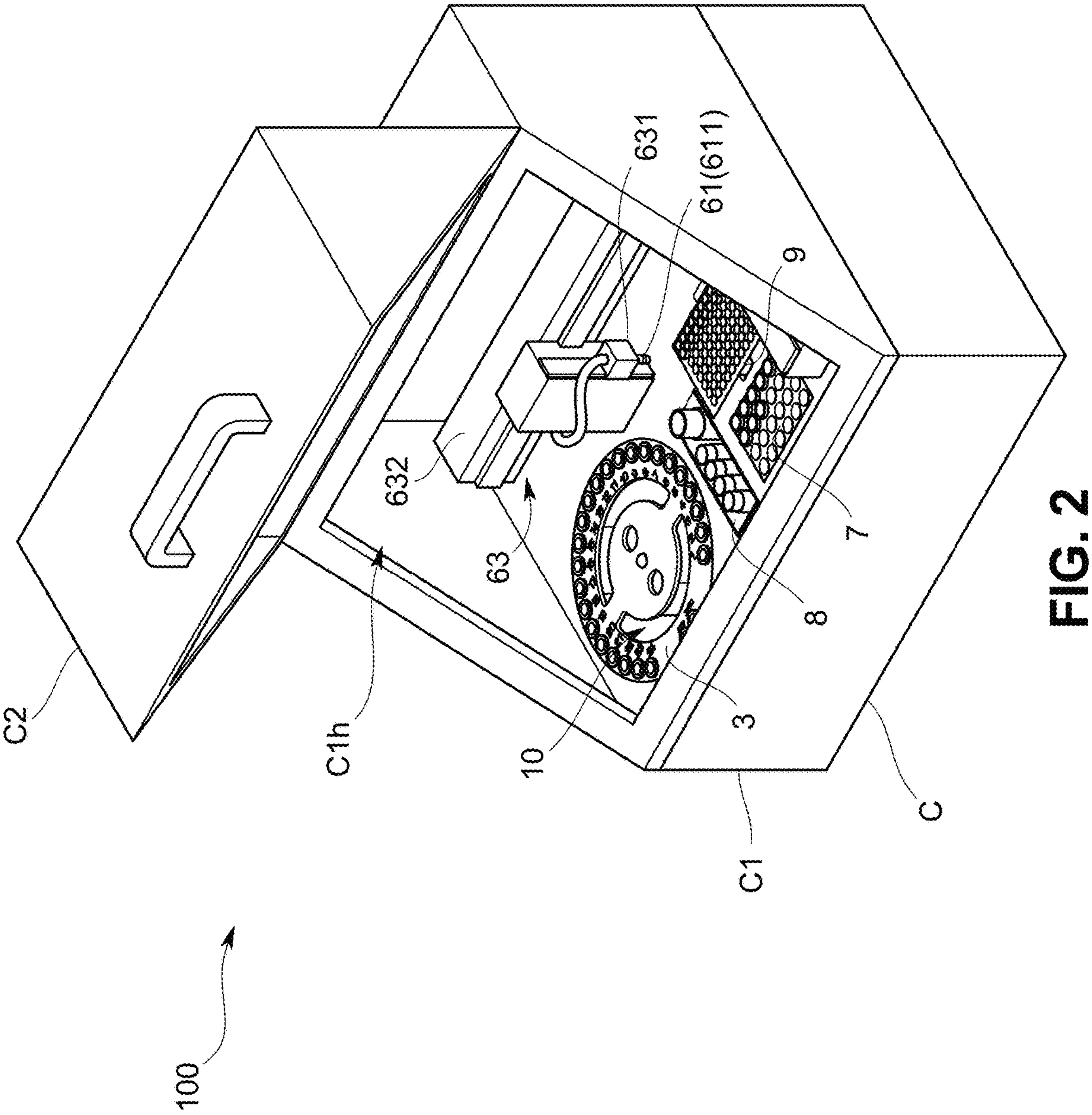
FIG. 2 is a perspective view illustrating an appearance of the biological sample analysis device according to the embodiment.
Figure 3:
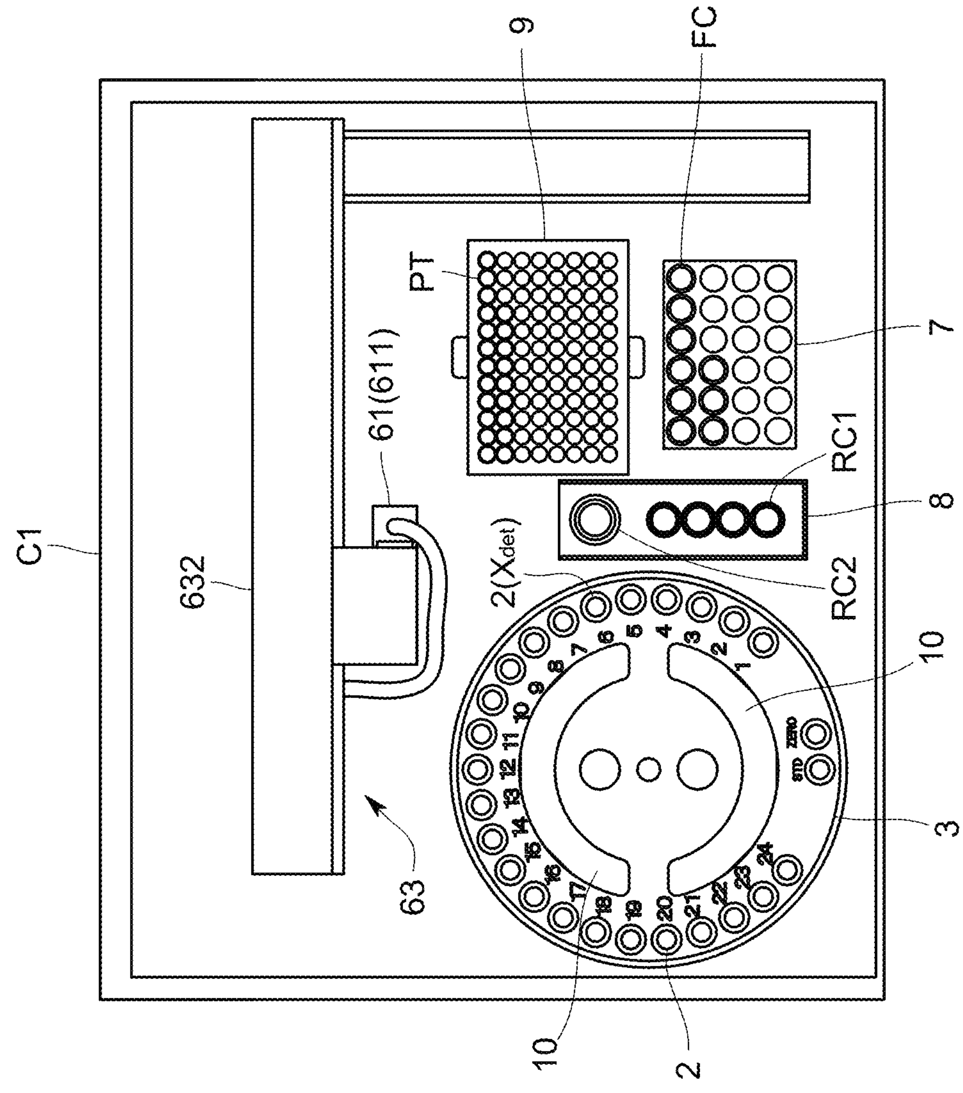
FIG. 3 is a plan view illustrating an arrangement of components of a device body according to the embodiment.

As illustrated in FIGS. 2 and 3, the biological sample analysis device 100 according to the embodiment includes a housing C having a door C2 for taking in and out the holder 3. The housing C includes a housing body C1 that accommodates measurement system instruments necessary for ATP measurement, such as the holder 3, the holder drive mechanism 5, and the dispensing mechanism 6, and the housing C includes a door C2 provided on the housing body C1. The housing body C1 has an opening C1*h* on a front surface. The door C2 can open and close the opening C1*h* of the housing body C1. Specifically, the door C2 is openable and closable by a horizontal coupling shaft (not illustrated) at an upper part of the opening C1*h*, and a user can access inside of the housing body C1 by lifting the door C2 upward.

Figure 4:
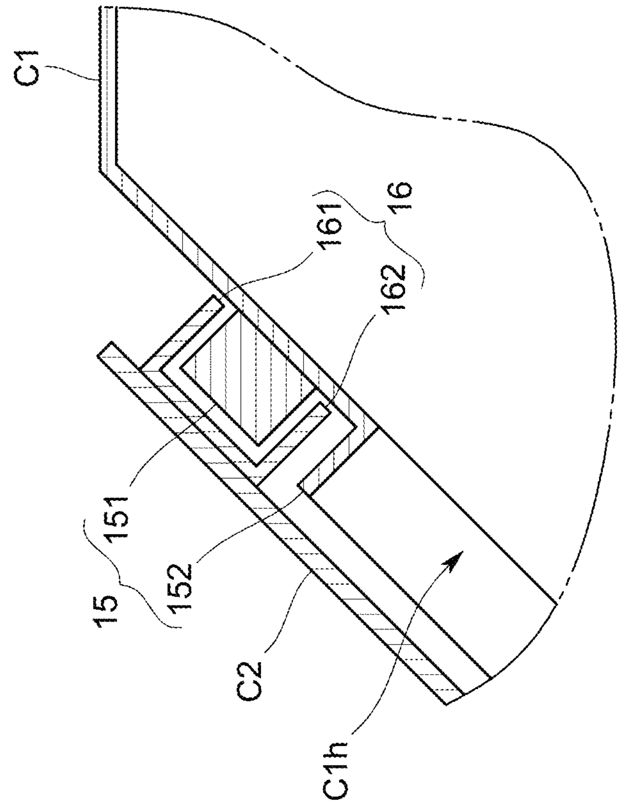
FIG. 4 is a partial sectional view illustrating an uneven structure of a housing body and a door according to the embodiment.

As illustrated in FIG. 4, contact portions of the housing body C1 and the door C2 are respectively provided with uneven structures 15 and 16 that are fitted to each other in a state where the door C2 closes the opening C1*h*. In FIGS. 2 and 3, the uneven structures 15 and 16 are omitted.

The uneven structures 15 and 16 are provided so as to surround substantially an entire periphery of the opening C1*h*. In the embodiment, the uneven structure 15 provided at the contact portion of the housing body C1 includes a body outer protrusion 151 provided so as to surround the opening C1*h*, and a body inner protrusion 152 provided so as to surround the opening C1*h* at an inner side of the body outer protrusion 151. Further, the uneven structure 16 provided at the contact portion of the door C2 includes a door outer protrusion 161 provided so as to surround the opening C1*h* at an outer side of the body outer protrusion 151 of the housing body C1, and a door inner protrusion 162 inserted between the body outer protrusion 151 and the body inner protrusion 152 of the housing body C1. The uneven structures 15 and 16 allow a path of light from outside to meander, and to be blocked before reaching inside of the device, and the inside of the device becomes a darkroom. This can reduce stray light and improve measurement accuracy. In addition, a space between the door C2 and the opening C1*h* may be sealed with a seal member (not illustrated) to make the inside of the housing C a darkroom.

Further, the housing body C1 is provided with a temperature control mechanism 7 that holds a plurality of specimen tubes FC storing specimens and controls a temperature of these plurality of specimen tubes FC, a reagent setting part 8 in which reagent containers RC1 and RC2 storing respective reagents are set, and a pipette tip setting part 9 provided with a pipette tip PT used for the dispensing mechanism 6.

The temperature control mechanism 7 accommodates and holds the plurality of specimen tubes FC, for example, in a matrix. The temperature control mechanism 7 includes a metallic (for example, aluminum) holder block 71 that holds the specimen tubes FC, a heat source 72 such as a heater provided in the holder block 71, and a temperature sensor 73 such as a thermocouple that detects a temperature of the holder block 71. On the basis of the temperature detected by the temperature sensor 73, the heater 72 as the heat source is controlled by a controller COM for the temperature of the holder block 71 to be a predetermined temperature.

In the reagent setting part 8, the reagent container RC1 storing a pretreatment reagent for subjecting a specimen to pretreatment and the reagent container RC2 storing a luminescent reagent are set. Examples of the pretreatment reagent include an ATP scavenging solution for scavenging ATP (free ATP) other than living cells (viable bacteria) contained in the specimen, a spore reaction solution for germinating bacteria in a spore state, and an ATP extract for extracting ATP from living cells.

Figure 5:
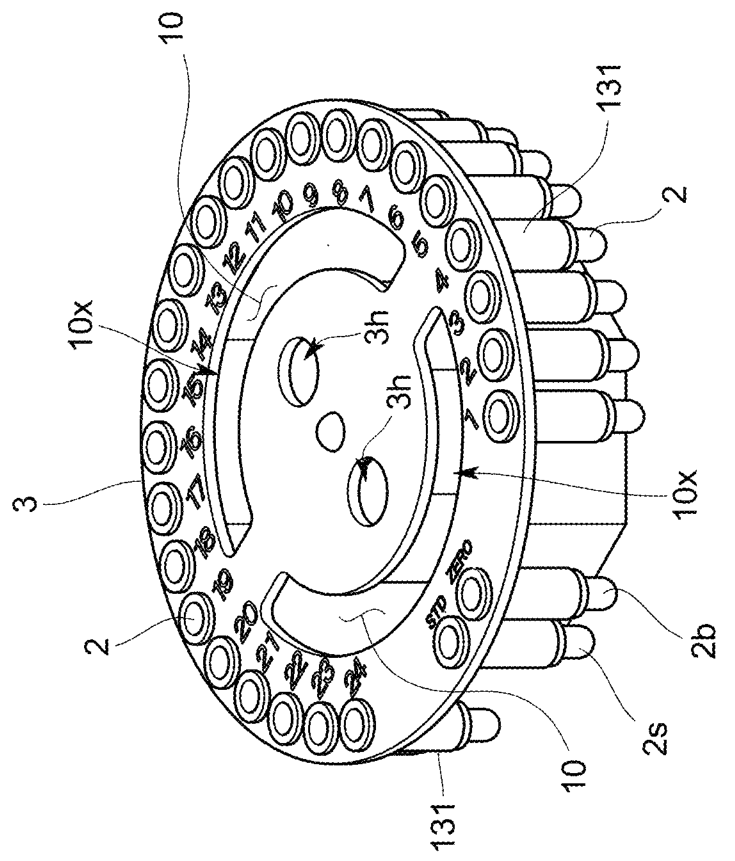
FIG. 5 is a perspective view of a holder holding a plurality of containers according to the embodiment.
Figure 6:
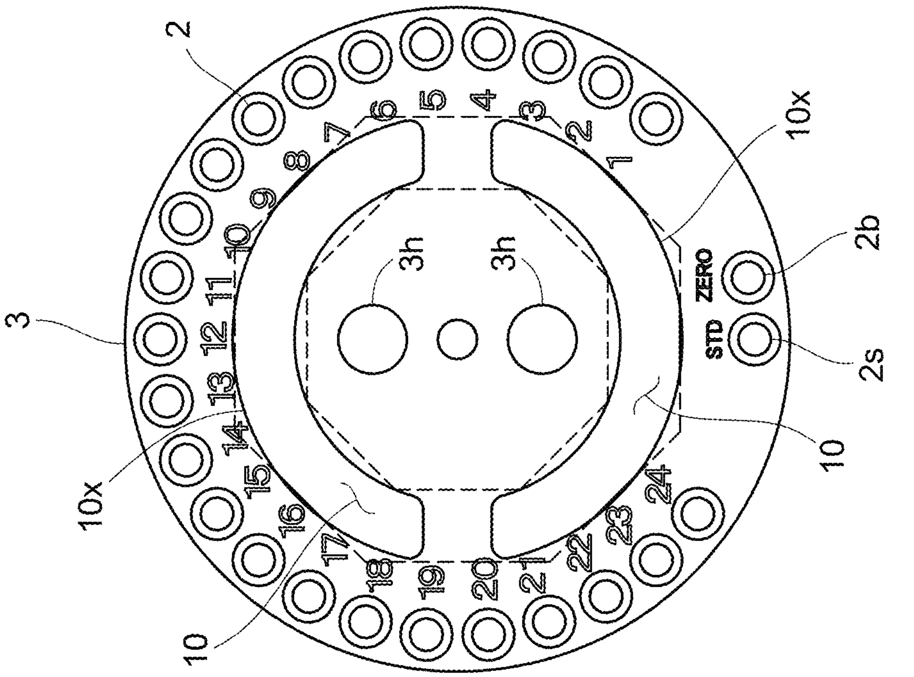
FIG. 6 is a plan view of the holder holding the plurality of containers according to the embodiment.

As illustrated in FIGS. 5 and 6, the holder 3 holds the plurality of containers 2 in a circular shape, and specifically, holds the plurality of containers 2 on an identical circle about a predetermined rotation center. In addition to the plurality of containers 2 for sample measurement, the holder 3 according to the embodiment holds a container 2*b* for blank measurement and a container 2*s* for standard solution measurement. Further, the holder 3 is attachable to and detachable from the device body, and a plurality of (two in this case) holding holes 3*h* for holding are formed in order to facilitate attaching and detaching operation. The container 2 includes a resin and has a bottomed cylindrical shape, and in the embodiment, the container 2 includes a resin and has a bottomed circular tube shape.

As illustrated in FIG. 1, the photodetector 4 detects light emitted from a sample in the container 2 held by the holder 3, and is, for example, a photomultiplier tube (PMT). The photodetector 4 is provided below the container 2 held by the holder 3. An optical system 12 having a reflector 11 for guiding light emitted from the sample in the container 2 to the photodetector 4 is provided above the photodetector 4. The reflector 11 is movable forward and backward with respect to the container 2 located above the reflector. The light emitted from the sample into the container 2 can be efficiently guided to the photodetector 4 by bringing the reflector 11 close to the container 2, and the container 2 cannot be prevented from moving by retracting the reflector 11 from the container 2. Another optical system 12 including the reflector 11, or the photodetector 4 may also be movable forward and backward with respect to the container 2.

The holder drive mechanism 5 moves the holder 3 to sequentially position the containers 2 held by the holder 3 at detection positions $X_{det}$ detected by the photodetector 4. Specifically, the holder drive mechanism 5 rotates the holder 3 around the predetermined rotation center. As illustrated in FIG. 1, the holder drive mechanism 5 includes an installation base 51 on which the holder 3 is installed, a rotation shaft 52 for rotating the holder 3 installed on the installation base 51, and an actuator 53 that rotates the rotation shaft 52. In addition, the holder drive mechanism 5 is provided with a rotational position sensor (not illustrated) that detects a rotational position of the holder 3. On the basis of a detection signal of the rotational position sensor, the actuator 53 is rotationally controlled by the controller COM so as to position the container 2 to be measured at the detection position $X_{det}$.

As illustrated in FIGS. 1 to 3, the dispensing mechanism 6 includes a nozzle 61 for sucking or discharging the sample or each reagent, a pump mechanism 62 such as a syringe that drives suction or discharge of the nozzle 61 through a flow path connected to the nozzle 61, and a nozzle moving mechanism 63 that moves the nozzle 61 in a predetermined direction.

The nozzle 61 includes a tip holder 611 that detachably holds the pipette tip PT that contacts and holds the sample and each reagent. The tip holder 611 includes an internal flow path, a base end to which a flow path is connected, and a distal end opening to which a pipette tip PT is connected.

The nozzle moving mechanism 63 linearly moves the nozzle 61 in a horizontal direction (an X-axis direction and a Y-axis direction) and linearly moves the nozzle 61 in a vertical direction (a Z-axis direction). Specifically, the nozzle moving mechanism 63 includes a movable member 631 that holds the nozzle 61, a slide mechanism 632 provided in the X-axis direction, the Y-axis direction, and the Z-axis direction, and an actuator 633 that moves the movable member 631 in each of the directions along the slide mechanism 632. Each operation in the ATP measurement is executed by controlling the actuator 633 and the pump mechanism 62 by the controller COM. Each operation in the ATP measurement naturally includes attachment and detachment of the pipette tip PT to and from the tip holder 611.

Furthermore, as illustrated in FIG. 1, the biological sample analysis device 100 includes a light shielding mechanism 13 that guides the light emitted from the sample in the container 2 located at the detection position $X_{det}$ to the photodetector 4 and prevents light emitted from the sample in other containers 2 (specifically, the containers 2 that have completed measurement) from being guided to the photodetector 4.

The light shielding mechanism 13 includes a container-side light shield 131 provided in each container 2, and a movable-side light shield 132 that moves forward and backward with respect to the container 2 located at the detection position $X_{det}$.

The container-side light shield 131 is constituted by a member having no light permeability, and covers an entire periphery of an upper part of each container 2. In the embodiment, the container-side light shield 131 having a cylindrical shape is provided on a container holding part of the holder 3, and the container 2 is accommodated in the container-side light shield 131, and thus the container-side light shield 131 covers the entire periphery of the upper part of the container 2 held by the holder 3.

The movable-side light shield 132 is constituted by a member having no light permeability, and covers the entire periphery of a lower part of the container 2 located at the detection position $X_{det}$, except for the upper part covered by the container-side light shield 131. The movable-side light shield 132 ascends and descends between a light shielding position at which the movable-side light shield covers the lower part of the container 2 located at the detection position $X_{det}$ and a retraction position at which the movable-side light shield is separated downward from the lower part of the container 2 and does not interfere with the movement of the holder 3 when the holder 3 moves. Note that the ascend and descend of the movable-side light shield 132 is performed by, for example, a lifting device 14 using an actuator. The lifting device 14 is controlled by the controller COM in conjunction with operations of the holder drive mechanism 5 and the dispensing mechanism 6.

In the biological sample analysis device 100 according to the embodiment, a disposal box 10 as a disposal tip storage for disposing the pipette tip PT of the dispensing mechanism 6 is integrally provided with the holder 3. Specifically, the disposal box 10 is provided at an inner side of the plurality of containers 2, the inner side serving as a dead space in the holder 3. The disposal box 10 has an arc-shaped opening 10*x* along an arrangement direction of the plurality of containers 2 in plan view. The disposal box 10 in plan view has a substantially octagonal ring shape illustrated in FIG. 5, but may have another shape such as a circular shape. The disposal box 10, which is provided in the holder 3, is taken in and out together with the holder 3 through the door C2. This eliminates the need for providing a drawer structure for drawing out the disposal box 10 in the device body, and allows secure shield of external light. In addition to elimination of the need for a drawer structure, a dead space other than the container holding part in the holder 3 can be effectively used, and the apparatus 100 can be therefore made compact.

In the holder 3, the holding holes 3*h* for inserting and holding fingers are formed at an inner side of the arc-shaped opening 10*x*. In this configuration, in a state where the holder 3 is held by the holding holes 3*h*, the disposal box 10 and the container 2 are positioned at an outer side of the holding hand, and inadvertent contact with the pipette tip PT having been discarded and the container 2 having been measured can be easily prevented.

Then, the pipette tip PT used for dispensing is detached above the disposal box 10 of the holder 3. Specifically, the detachment may be performed by moving the nozzle 61 to a chip detachment member (not illustrated) arranged above the disposal box 10. Alternatively, the chip detachment member is provided in the movable member 631, the movable member 631 is moved to above the disposal box 10, and then the detachment may be performed using the chip detachment member.

When each pipette tip PT is detached, the controller COM controls the holder drive mechanism 5 and the dispensing mechanism 6 such that the pipette tip PT is not unevenly distributed at one spot in the disposal box 10. As this control mode, it is conceivable that (1) the holder 3 is rotated by a predetermined angle every time each pipette tip PT is detached to change a disposal position with respect to the disposal box 10, (2) the holder 3 is rotated by a predetermined angle every time a predetermined number of pipette tips PT are detached while the disposal position of the predetermined number of pipette tips PT keeps the same to change the disposal position with respect to the disposal box 10, and the like. This control can scatter, as a whole, the pipette tips PT discarded in the disposal box 10, and prevent the pipette tips PT from being unevenly distributed at one spot and protruding from the disposal box 10.

<Analysis Method>

Next, an analysis method will be described together with operation of the biological sample analysis device 100 configured as described above.

For example, a large volume (for example, from 50 ml to 200 ml) of a specimen is concentrated to a predetermined amount (for example, from 1 μl to 1,000 μl) to generate a sample.

Figure 7:
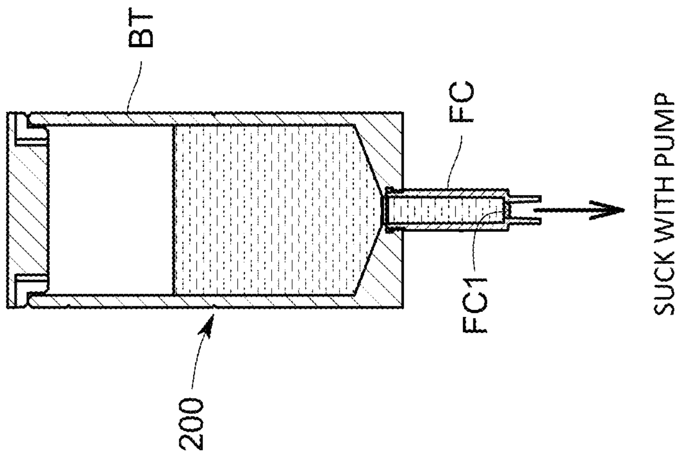
FIGS. 7(A) and 7(B) are schematic views illustrating a concentration step of a sample according to the embodiment.
Figure 7B:
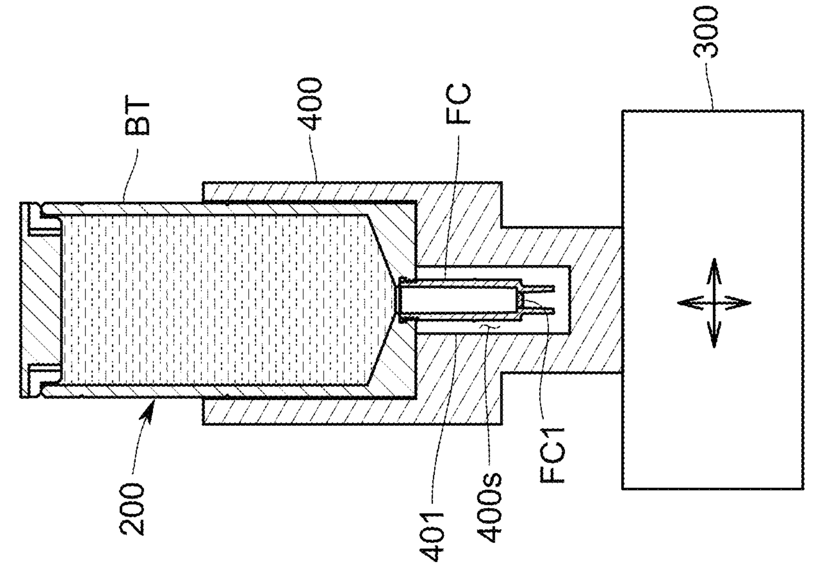

In this concentration step, as illustrated in FIG. 7(A), an upper end of a cartridge (specimen tube FC) in which a filter FC1 is formed is inserted into a lower end opening of a bottle BT that stores a large-volume specimen, and the specimen is sucked from a lower end of the specimen tube FC with a pump to concentrate the sample onto the filter FC1 of the specimen tube FC. However, in some cases, an air layer is formed at a connection between the specimen tube FC and the lower end opening of the bottle BT, and suction is unsuccessful. Therefore, as illustrated in FIG. 7(B), it is conceivable to remove the air layer by subjecting the sample container 200 including the bottle BT and the specimen tube FC to a vibratory stirrer 300. At this time, since the specimen tube FC is thinner than the bottle BT, it is desirable to use a container holder 400 for setting the sample container 200 in the vibratory stirrer 300. The container holder 400 accommodates the specimen tube FC and holds the sample container 200 in contact with a lower surface and side surfaces of the bottle BT. Here, a tube accommodating part 401 that accommodates the specimen tube FC forms a space 400*s* with the accommodated specimen tube FC so as to prevent the specimen tube FC from contacting the container holder 400 and being contaminated.

As described above, the specimen tube FC storing the concentrated sample is set in the temperature control mechanism 7. The door C2 is closed in a state where a predetermined number of specimen tubes FC are set, and the measurement is started. Although each container 2 held by the holder 3 in this state is empty, the container 2 for standard solution measurement stores a standard solution having a known ATP amount.

When the measurement is started, the controller COM causes the dispensing mechanism 6 to dispense each pretreatment reagent into each of the specimen tubes FC held by the temperature control mechanism 7 in accordance with a predetermined sequence. As a result, the sample in the specimen tubes FC is subjected to predetermined pretreatment (ATP extraction). Note that the pipette tips PT are replaced for each pretreatment reagent, and the used pipette tips PT are discarded in the disposal box 10.

Specifically, a mixed solution of the ATP scavenging solution and the spore reaction solution is dispensed into the sample in the specimen tube FC, and the sample is kept at a predetermined temperature and is on standby until a reaction of each reagent is completed. Thereafter, the ATP extract is dispensed into the sample in the specimen tube FC, and the sample is kept at a predetermined temperature and is on standby until the extraction of ATP is completed. Instead of the mixed solution of the ATP scavenging solution and the spore reaction solution, the ATP scavenging solution and the spore reaction solution may be separately dispensed.

As for a calibration solution, during the standby after the reagent is dispensed into the sample, each pretreatment reagent is dispensed into a standard solution having a known ATP amount and a zero solution having a zero ATP amount in accordance with a predetermined sequence. Specifically, after dispensing the ATP scavenging solution and the spore reaction solution into the standard solution and the zero solution, the ATP extract is dispensed. Since the standard solution is stored in the container 2*s* for standard solution measurement and the zero solution is stored in the container 2*b* for blank measurement, the dispensing mechanism 6 dispenses each pretreatment reagent into the container 2*s* and the container 2*b*. An order of dispensing each pretreatment reagent into the zero solution is not limited to the above order.

At this time, as shown in FIG. 8, the mixing ratio of the sample, the ATP scavenging solution, the spore reaction solution, and the ATP extract, a mixing ratio of the standard solution, the ATP scavenging solution, the spore reaction solution, and the ATP extract, and a mixing ratio of the zero solution, the ATP scavenging solution, the spore reaction solution, and the ATP extract are set to be the same. Specifically, these mixing ratios are set to a predetermined value. In this manner, by equalizing a solution amount of each reagent among the sample, the standard solution, and the zero solution, pH in the solution can be equalized. As a result, preconditions of the solution before dispensing the luminescent reagent can be equalized, and accurate light intensity can be detected.

Thereafter, the dispensing mechanism 6 dispenses the sample in each of the specimen tubes FC after the pretreatment into each of the containers 2 held by the holder 3.

Then, the controller COM causes the holder drive mechanism 5 to move the container 2 to be measured to the detection position $X_{det}$. After moving the container 2 to be measured to the detection position $X_{det}$, the controller COM causes the lifting device 14 to move the movable-side light shield 132 of the light shielding mechanism 13 to a light shielding position. After this state, the controller COM causes the dispensing mechanism 6 to introduce the luminescent reagent into the container 2 located at the detection position $X_{det}$. Thus, light emitted from the sample in the container 2 located at the detection position $X_{det}$ is detected by the photodetector 4. Before measurement of luminescence of each container 2, blank measurement and standard solution measurement are performed, and zero point calibration and span calibration are performed.

A light intensity signal obtained by the photodetector 4 is subjected to arithmetic processing by a calculator of the controller COM to calculate an ATP amount (amol).

Specifically, a calculator COM1 of the controller COM subtracts a "light intensity signal obtained before the luminescent reagent is added" from a "light intensity signal obtained after the luminescent reagent is added to the sample" to remove light stored in the container 2, and calculates a value related to the amount of the biological substance.

The "light intensity signal obtained after the luminescent reagent is added to the sample" is an integrated average signal as an average value of integrated signals for a predetermined time (for example, several seconds to several tens of seconds) from a time at which the luminescent reagent is introduced. The "light intensity signal obtained before the luminescent reagent is added" is an integrated average signal as an average value of integrated signals for a predetermined time (for example, several seconds to several tens of seconds) before the luminescent reagent is introduced. Here, the "light intensity signal obtained before the luminescent reagent is added" is based on the light stored in the container 2. For example, when the container 2 is placed outside the biological sample analysis device 100 before the measurement is started, light of ultraviolet rays, a fluorescent lamp, or the like is stored in the container 2 in some cases. Therefore, the calculator COM1 subtracts a "second light intensity signal that is a light intensity signal only from the container 2" from a "first light intensity signal including the light intensity signal derived from the container 2 and a light intensity signal of biological origin". As a result, the biological sample analysis device 100 can accurately calculate only the light intensity signal of biological origin. The same applies to signal processing in the blank measurement and the standard solution measurement. The light intensity signal is not limited to the integrated average signal, and may be a simple integrated signal for a predetermined time (for example, several seconds to several tens of seconds) from the time at which the luminescent reagent is introduced, or may be a signal subjected to other arithmetic processing.

Figure 9:
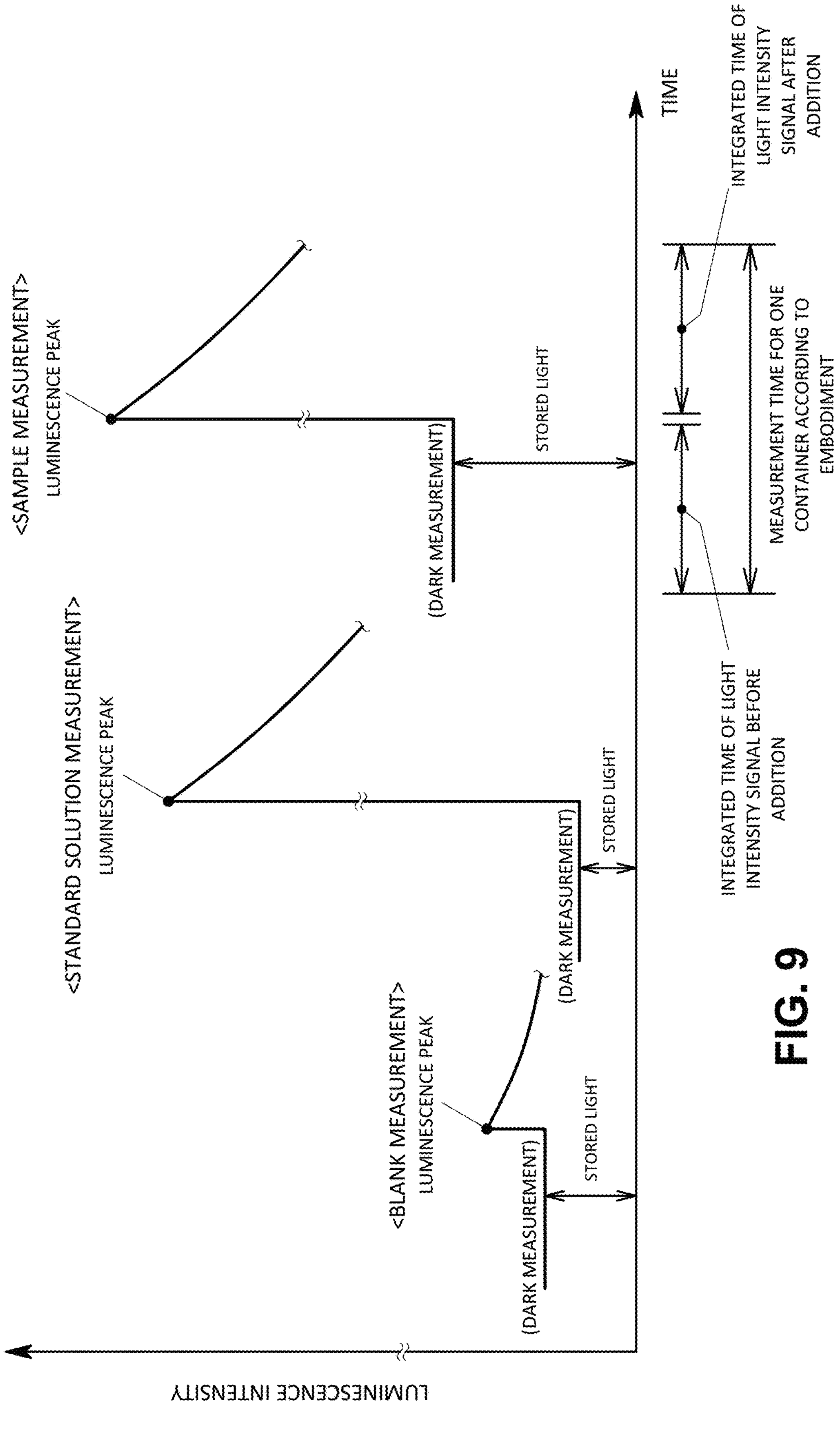
FIG. 9 is a schematic diagram for describing a calculation method in each container according to the embodiment.

In this manner, the calculator COM1 of the controller COM calculates ATP [amol] for each of the containers 2 by the following equation (see FIG. 9).

$$ATP[amol] = \frac{Sample_{signal} - Zero_{signal}}{STD_{signal} - Zero_{signal}} \times 1000 \qquad \text{[Equation 1]}$$

$Sample_{signal}$ is a signal obtained from the sample measurement, and is a signal obtained by subtracting the "light intensity signal obtained before the luminescent reagent is added to the sample" from the "light intensity signal obtained after the luminescent reagent is added to the sample".

$STD_{signal}$ is a signal obtained from the standard solution measurement, and is a signal obtained by subtracting the "light intensity signal obtained before the luminescent reagent is added to the standard solution" from the "light intensity signal obtained after the luminescent reagent is added to the standard solution".

$Zero_{single}$ is a signal obtained from the blank measurement, and is a signal obtained by subtracting the "light intensity signal obtained before the luminescent reagent is added to the zero solution" from the "light intensity signal obtained after the luminescent reagent is added to the zero solution". In FIG. 9, a luminescence peak occurs when the luminescent reagent is added in the blank measurement, but may not occur.

By the above calculations, variations in stored light amounts of the container 2*s* for standard solution measurement, the container 2*b* for blank measurement, and the container 2 for sample measurement can be removed, and the ATP amount can be accurately calculated.

After measurement of luminescence of one container 2 is completed, the controller COM causes the lifting device 14 to move the movable-side light shield 132 of the light shielding mechanism 13 to the retraction position, and then causes the holder drive mechanism 5 to move the container 2 to be measured next to the detection position $X_{det}$. In this way, the luminescence of the sample in each container 2 is sequentially measured. Here, the pipette tip PT is replaced each time the luminescence of the sample in each container 2 is measured, and the used pipette tip PT is discarded in the disposal box 10.

After the measurement is completed for all the samples in this manner, the door C2 is opened to replace the specimen tubes FC held by the temperature control mechanism 7, and the containers 2 held by the holder 3 are replaced. Here, when the containers 2 held by the holder 3 are replaced, the holder 3 is removed from the device body by holding the holding holes 3*h* of the holder 3. Since the holder 3 includes the used and discarded pipette tips PT in the disposal box 10 of the holder 3, the discarded pipette tips PT can also be taken out from the device body at the same time by detaching the holder 3 from the device body.

Figure 10A:
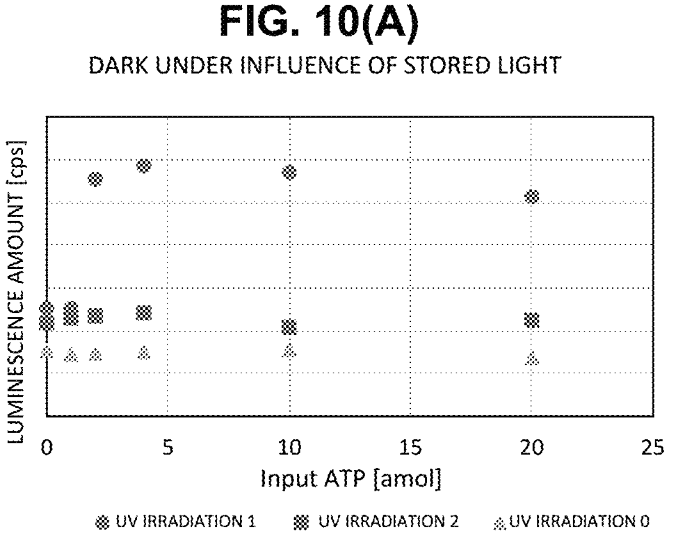
FIGS. 10(A)-10(C) are diagrams illustrating results of a linearity evaluation of an ATP amount and a luminescence amount under influence of light stored in the container.
Figure 10B:
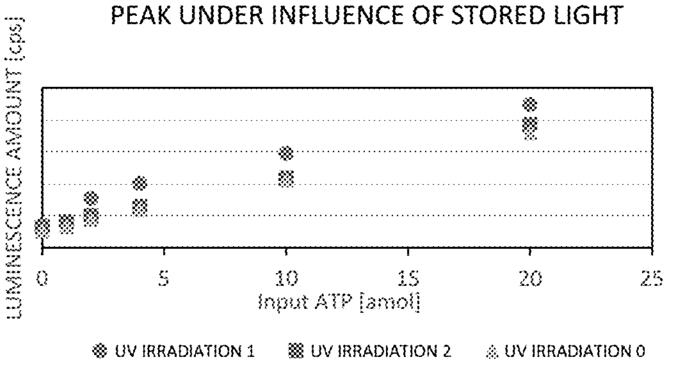
Figure 10C:
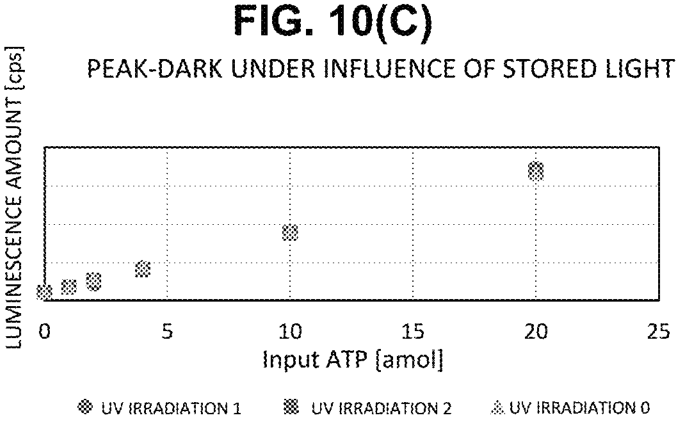

Next, using a container irradiated with ultraviolet rays and a container not irradiated with ultraviolet rays, ATP solutions adjusted to 0, 1, 2, 4, 10, and 20 amol/L are measured using the biological sample analysis device 100. FIGS. 10(A)-10 (C) illustrate luminescence amounts in the containers.

It can be seen that the luminescence amount in dark measurement under influence of stored light (light intensity signal obtained before the luminescent reagent is added) is larger in the container irradiated with ultraviolet rays. Further, it can be seen that the luminescence amount in peak measurement under influence of stored light (light intensity signal obtained after the luminescent reagent is added) is also larger in the container irradiated with ultraviolet rays.

Meanwhile, by subtracting the luminescence amount of the dark measurement from the luminescence amount of the peak measurement, the luminescence amount of the container irradiated with ultraviolet rays and the luminescence amount of the container not irradiated with ultraviolet rays are substantially matched. Therefore, it can be seen that the ATP amount can be calculated by removing the stored light amount of the container by the above calculation method.

Effects of Embodiment

In the biological sample analysis device 100 according to the embodiment configured as described above, the light intensity signal obtained before the luminescent reagent is added is subtracted from the light intensity signal obtained after the luminescent reagent is added to the sample to calculate the value related to the amount of the biological substance, and thus, there is no need to detect the "luminescence intensity in a state where the luminescence is reduced" as in the conventional art. As a result, measurement time of the sample can be shortened. Further, since the light stored in the container 2 is removed by subtracting the light intensity signal obtained before the luminescent reagent is added from the light intensity signal obtained after the luminescent reagent is added to the sample, there is no need to consider the light stored in the container 2 storing the sample, and the measurement accuracy can be improved.

OTHER EMBODIMENTS

Note that the present invention is not limited to the embodiment.

For example, the holder 3 holds the plurality of containers 2 in a circular shape, but may hold the plurality of containers 2 in an annular shape such that the plurality of containers 2 are arranged, for example, in a rectangular shape, a polygonal shape, or an elliptical shape.

In the embodiment, the disposal box 10 has two openings 10*x*, but may have one or three or more openings 10*x*.

Figure 11:
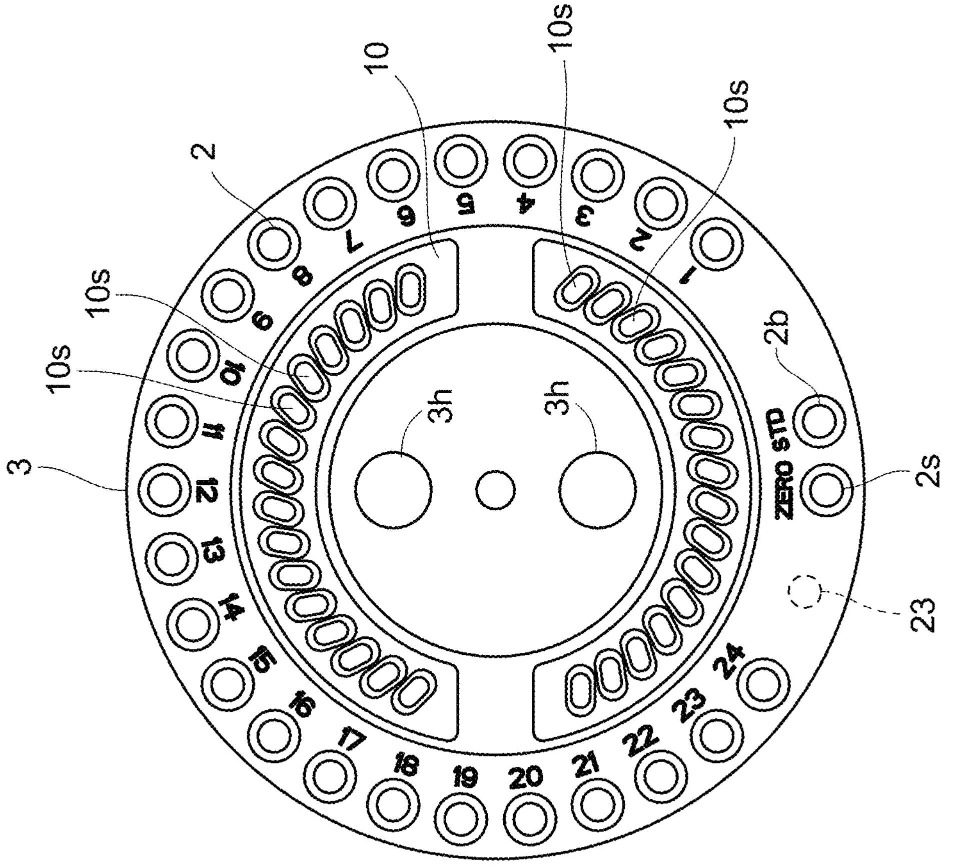
FIG. 11 is a plan view of a holder holding a plurality of containers according to a modified embodiment.
Figure 12:
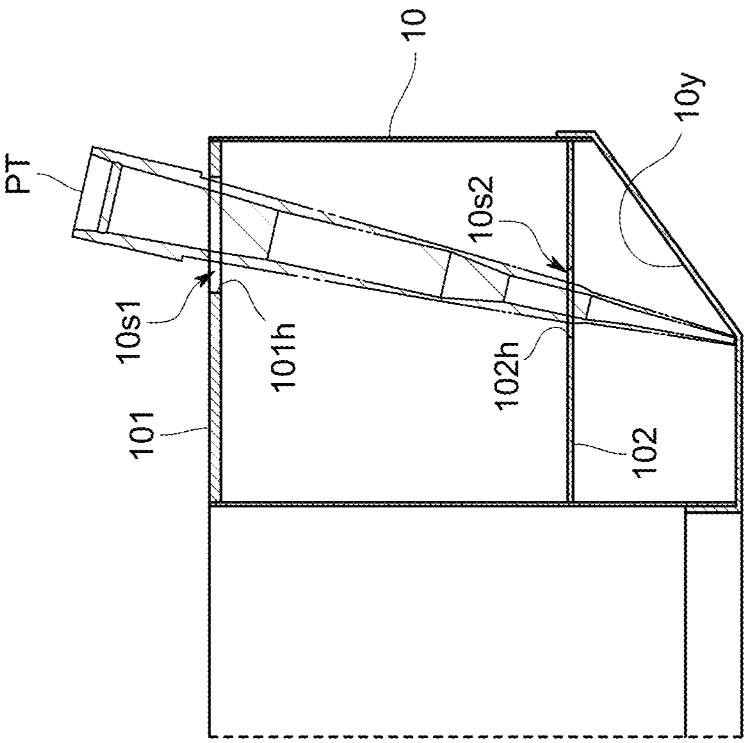
FIG. 12 is a schematic sectional view of a disposal space according to a modified embodiment.
Figure 13:
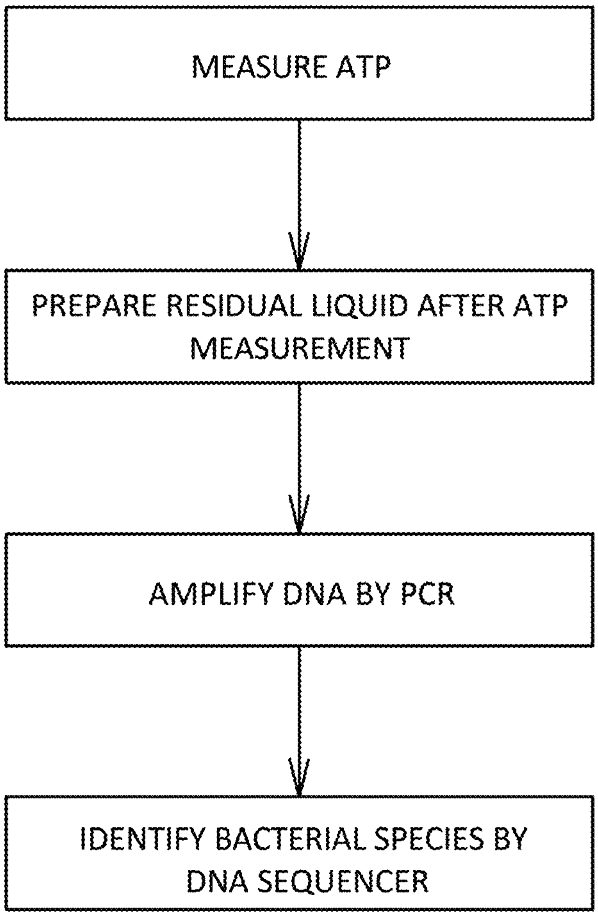
FIG. 13 is a flowchart of a DNA identification method according to a modified embodiment.

As illustrated in FIG. 11, in the disposal box 10, a disposal space 10*s* is partitioned for each pipette tip PT to be discarded. As illustrated in FIG. 12, the disposal space 10*s* includes an opening 10*s*1 that opens in an upper surface of the disposal box 10, and a throttling portion 10*s*2 that is formed vertically below the opening 10*s*1 and has an opening area smaller than an opening area of the opening 10*s*1. In this example, the opening 10*s*1 of each disposal space 10*s* is formed by forming a through hole 101*h* in an upper surface plate 101 of the disposal box 10, and the throttling portion 10*s*2 of each disposal space 10*s* is formed by forming a through hole 102*h* in an intermediate plate 102 provided inside the disposal box 10. Since the disposal space 10*s* is partitioned for each pipette tip PT in this manner, the pipette tips PT can be discarded smoothly without being disturbed by the pipette tips PT having been already discarded. In addition, since the pipette tips PT discarded in the disposal box 10 are separated from each other, this facilitates detachment of the pipette tips PT discarded from the disposal box 10 and, for example, removal of waste liquid remaining in the pipette tips PT from the pipette tips PT.

Further, the disposal box 10 may have a slope 10*y* that inclines each pipette tip PT discarded in each disposal space 10*s* in a predetermined direction. The slope 10*y* is inclined such that upper ends of the pipette tips PT discarded in the disposal spaces 10*s* do not interfere with each other. In the example in FIG. 11, the slope 10*y* is a tapered surface formed on a bottom surface or an inner surface of the disposal box 10, and moves a tip of each pipette tip PT toward a rotation center axis of the holder 3 to position the upper end of each pipette tip PT radially outward. As a result, the pipette tips PT discarded in the disposal box 10 become radial in plan view. The slope 10*y* may be constituted by a member different from the disposal box 10. The slope 10*y* configured as described above can align the direction of the pipette tips PT discarded in the disposal spaces 10*s*, and can prevent the pipette tips PT to be discarded from being disturbed.

In the embodiment, the holder 3 and the disposal box are integrally formed. However, the holder 3 and the disposal box 10 may be separately provided.

In the embodiment, the luminescent reagent is added to the container storing the biological sample, but the biological sample may be added to the container storing the luminescent reagent.

In addition, bacterial species contained in a sample whose ATP is measured by the biological sample analysis device according to the embodiment may be identified.

Specifically, as shown in FIG. 12, it is conceivable to use a residual liquid after the luminescent reagent is added (sample after ATP measurement) or a residual liquid in the specimen tube FC (sample before ATP measurement) to identify the bacterial species from DNA or RNA contained in a residual liquid. More specifically, the bacterial species are identified from the residual liquid by using a DNA sequencer. As for RNA, a DNA sequencer can be used after DNA is synthesized by reverse transcription.

As pretreatment for analysis with a DNA sequencer, amplification by a DNA amplification method (PCR) is considered. Here, the residual liquid is collected using, for example, DNA collecting beads, and the collected DNA is amplified by PCR. The residual liquid contains an ATP extract. As the ATP extract, for example, a surfactant, a mixed solution of ethanol and ammonia, methanol, ethanol, trichloroacetic acid, perchloric acid, a Tris buffer solution, or the like can be suitably used. Examples of the surfactant include sodium dodecyl sulfate, potassium lauryl sulfate, sodium monolauroyl phosphate, sodium alkylbenzene sulfonate, benzalkonium chloride, benzethonium chloride, cetylpyridinium chloride, cetyltrimethylammonium bromide, and myristyl dimethylbenzylammonium chloride. Some ATP extracts inhibit action of enzymes that break down DNA. As for a sample after ATP measurement, there is a possibility that the ATP extract inactivates the enzyme of PCR, and thus pretreatment of removing the ATP extract may be performed.

Furthermore, it is also possible to measure an ATP amount of bacteria in a spore state (spore bacteria) by the biological sample analysis device according to the embodiment. That is, the ATP amount of the spore bacteria can be measured by subtracting the ATP amount before the spore bacteria germinate from the ATP amount after the spore bacteria germinate.

Specifically, an ATP amount of only bacteria in a normal state before the spore bacteria germinate (viable bacteria) (Y [amol]) can be measured by performing ATP measurement without putting the spore reaction solution into the sample or before the spore bacteria germinate in a case where the spore reaction solution has been put into the sample. An ATP amount of both the spore bacteria and the viable bacteria (X [amol]) can be measured by performing ATP measurement after the spore reaction solution of the sample is added to germinate the spore bacteria. Then, the ATP amount of the spore bacteria can be calculated by X-Y [amol]. A large value of X-Y indicates generation of spore bacteria, and a user can take measures such as cleaning with a sporocide. Further, viable bacteria in the sample are killed using a certain method (for example, a heat shock method). Then, the ATP amount of the spore bacteria can also be measured by germinating the spore bacteria by heating or germinating the spore bacteria by adding nutrients.

The present invention is not limited to the embodiment, and it goes without saying that various modifications can be made without departing from the gist of the present invention.

INDUSTRIAL APPLICABILITY

The present invention can shorten the measurement time of the sample and improve the measurement accuracy.

The invention claimed is:

1. A biological sample analysis device configured to analyze a sample containing a biological substance, the biological sample analysis device comprising:
   - a sample measurement container configured to store the sample;
   - a standard solution measurement container configured to store a standard solution that is a liquid having a known amount of the biological substance;
   - a blank solution measurement container configured to store a zero solution that is a liquid having a zero biological substance amount;
   - a photodetector configured to be:
     - optically coupled to the sample measurement container to detect a second luminescence of the sample measurement container after the sample is stored in the sample measurement container and before a luminescent reagent is added to the sample measurement container, and a first luminescence of the sample measurement container after the sample is stored in the sample measurement container and after the luminescent reagent is added to the sample measurement container, and output a first light intensity signal corresponding to the first luminescence and a second light intensity signal corresponding to the second luminescence; and
     - optically coupled to the standard solution measurement container to detect a second standard luminescence of the standard solution measurement container after the standard solution is stored in the standard solution measurement container and before the luminescent reagent is added to the standard solution measurement container, and a first standard luminescence of the standard solution measurement container after the standard solution is stored in the standard solution measurement container and after the luminescent reagent is added to the standard solution measurement container, and output a first standard light intensity signal corresponding to the first standard luminescence and a second standard light intensity signal corresponding to the second standard luminescence;
   - optically coupled to the blank solution measurement container to detect a second zero luminescence of the blank solution measurement container after the zero solution is stored in the blank solution measurement container and before the luminescent reagent is added to the blank solution measurement container, and a first zero luminescence of the blank solution measurement container after the zero solution is stored in the blank solution measurement container and after the luminescent reagent is added to the blank solution measurement container, and output a first zero light intensity signal corresponding to the first zero luminescence and a second zero light intensity signal corresponding to the second zero luminescence; and
   - a calculator operatively coupled to the photodetector, wherein the calculator is configured to:
     - remove the light stored in the sample measurement container by subtracting, from the first light intensity signal obtained after the luminescent reagent is added to the sample measurement container, the second light intensity signal obtained before the luminescent reagent is added to the sample measurement container to obtain a sample-derived light intensity signal;

remove the light stored in the standard solution measurement container by subtracting, from the first standard light intensity signal obtained after the luminescent reagent is added to the standard solution measurement container, the second standard light intensity signal obtained before the luminescent reagent is added to the standard solution measurement container to obtain a standard solution-derived light intensity signal;

remove the light stored in the blank solution measurement container by subtracting, from the first zero light intensity signal obtained after the luminescent reagent is added to the blank solution measurement container, the second zero light intensity signal obtained before the luminescent reagent is added to the blank solution measurement container to obtain a zero solution-derived light intensity signal; and calculate a value related to an amount of the biological substance in the sample using the sample-derived light intensity signal, the standard solution-derived light intensity signal and the zero solution-derived light intensity signal.

2. The biological sample analysis device according to claim 1, wherein the photodetector is configured to sequentially detect the first luminescence and the second luminescence of the sample stored in the sample measurement container and detect the first standard luminescence and the second standard luminescence of the standard solution stored in the standard solution measurement container and detect the first zero luminescence and the second zero luminescence of the zero solution stored in the blank solution measurement container.

3. The biological sample analysis device according to claim 1, wherein the biological substance is adenosine triphosphate (ATP);

the luminescent reagent added to the sample measurement container is an ATP luminescent reagent; and the first luminescence is ATP-derived luminescence generated by a reaction between the sample and the luminescent reagent.

4. The biological sample analysis device according to claim 3, further comprising:

a controller; and a dispensing mechanism operatively coupled to the controller and configured to dispense a reagent into the sample, the standard solution having a known ATP amount, and the zero solution having a zero ATP amount, wherein the dispensing mechanism is controlled by the controller to equalize a mixing ratio of an ATP scavenging solution, a spore reaction solution, and an ATP extract to be added to the sample, a mixing ratio of the ATP scavenging solution, the spore reaction solution, and the ATP extract in the standard solution, and a mixing ratio of the ATP scavenging solution, the spore reaction solution, and the ATP extract in the zero solution.

5. The biological sample analysis device according to claim 4, wherein the dispensing mechanism is controlled by the controller to add the ATP extract after adding the ATP scavenging solution and the spore reaction solution to the standard solution.

6. The biological sample analysis device according to claim 1, further comprising a disposal box including disposal spaces respectively partitioned for pipette tips to be discarded, wherein the disposal box is provided at an inner side of at least one of the sample measurement container, the standard solution measurement container, or the blank solution measurement container.

7. The biological sample analysis device according to claim 6, further comprising a surface of the disposal box forming a slope that inclines the pipette tips discarded in the disposal spaces in a predetermined direction.

8. The biological sample analysis device according to claim 1, further comprising:

a housing body that accommodates a measurement system instrument comprising at least a portion of the biological sample analysis device and being configured for biological sample analysis inside, the housing body including an opening;

a door that opens and closes the opening of the housing body; and uneven structures respectively provided on contact portions of the opening of the housing body and the door, the uneven structures being fitted to each other in a state where the door closes the opening, wherein the uneven structure provided at the contact portion of the housing body including a body outer protrusion provided so as to surround the opening;

a body inner protrusion provided so as to surround the opening at an inner side of the body outer protrusion; and the uneven structure provided at the contact portion of the door including a door outer protrusion provided so as to surround the opening at an outer side of the body outer protrusion of the housing body and a door inner protrusion inserted between the body outer protrusion and the body inner protrusion of the housing body.

9. A biological sample analysis method for a biological sample analysis device configured to analyze a sample containing a biological substance, the biological sample analysis method comprising:

storing the sample containing the biological substance in a sample measurement container for a sample measurement;

detecting a second luminescence of the sample measurement container after the sample is stored in the sample measurement container and before a luminescent reagent is added to the sample measurement container;

outputting a second light intensity signal corresponding to the second luminescence;

adding the luminescent reagent into the sample measurement container;

detecting a first luminescence of the sample measurement container after the sample is stored in the sample measurement container and after the luminescent reagent is added into the sample measurement container;

outputting a first light intensity signal corresponding to the first luminescence;

storing a standard solution that is a liquid having a known amount of the biological substance in a standard solution measurement container;

detecting a second standard luminescence of the standard solution measurement container after the standard solution is stored in the standard solution measurement container and before the luminescent reagent is added to the standard solution measurement container;

outputting a second standard light intensity signal corresponding to the second standard luminescence;

adding the luminescent reagent into the standard solution measurement container;

detecting a first standard luminescence of the standard solution measurement container after the standard solution is stored in the standard solution measurement container and after the luminescent reagent is added into the standard solution measurement container;

outputting a first standard light intensity signal corresponding to the first standard luminescence;

storing a zero solution that is a liquid having a zero biological substance amount in a blank solution measurement container;

detecting a second zero luminescence of the blank solution measurement container after the zero solution is stored in the blank solution measurement container and before the luminescent reagent is added to the blank solution measurement container;

outputting a second zero light intensity signal corresponding to the second zero luminescence;

adding the luminescent reagent into the blank solution measurement container;

detecting a first zero luminescence of the blank solution measurement container after the zero solution is stored in the blank solution measurement container and after the luminescent reagent is added to the blank solution measurement container;

outputting a first zero light intensity signal corresponding to the first zero luminescence;

removing light stored in the sample measurement container by subtracting, from the first light intensity signal obtained after the luminescent reagent is added to the sample measurement container, the second light intensity signal obtained before the luminescent reagent is added to the sample measurement container to obtain a sample-derived light intensity signal;

removing light stored in the standard solution measurement container by subtracting, from the first standard light intensity signal obtained after the luminescent reagent is added to the standard solution measurement container, the second standard light intensity signal obtained before the luminescent reagent is added to the standard solution measurement container to obtain a standard solution-derived light intensity signal;

removing light stored in the blank solution measurement container by subtracting, from the first zero light intensity signal obtained after the luminescent reagent is added to the blank solution measurement container, the second zero light intensity signal obtained before the luminescent reagent is added to the blank solution measurement container to obtain a zero solution-derived light intensity signal; and calculating a value related to an amount of the biological substance in the sample using the sample-derived light intensity signal, the standard solution-derived light intensity signal and the zero solution-derived light intensity signal.

* * * * *